(12) United States Patent
Strumolo et al.

(10) Patent No.: US 7,130,730 B2
(45) Date of Patent: Oct. 31, 2006

(54) SENSING STRATEGY FOR DAMAGE MITIGATION IN COMPATABILITY SITUATIONS

(75) Inventors: Gary Steven Strumolo, Beverly Hills, MI (US); Manoharprasad K. Rao, Novi, MI (US); Kwaku O. Prakah-Asante, Commerce Township, MI (US); Priyaranjan Prasad, Plymouth, MI (US); Saeed David Barbat, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 310 days.

(21) Appl. No.: 10/065,505

(22) Filed: Oct. 25, 2002

(65) Prior Publication Data

US 2004/0083042 A1 Apr. 29, 2004

(51) Int. Cl.
 *G06F 17/00* (2006.01)
(52) U.S. Cl. ...................................................... 701/45
(58) Field of Classification Search .................. 701/36, 701/45; 280/727, 728.1, 728.2, 728.3, 734–735, 280/748–749; 180/271
 See application file for complete search history.

(56) References Cited

U.S. PATENT DOCUMENTS

| | | | |
|---|---|---|---|
| 3,778,823 A * | 12/1973 | Sato et al. ..................... 342/72 |
| 5,479,173 A | 12/1995 | Yoshioka et al. | |
| 5,617,085 A * | 4/1997 | Tsutsumi et al. ........... 340/903 |
| 6,037,860 A | 3/2000 | Zander et al. | |
| 6,327,528 B1 * | 12/2001 | Vallette et al. ................. 701/45 |
| 6,580,385 B1 * | 6/2003 | Winner et al. ................. 342/70 |
| 2003/0065432 A1 * | 4/2003 | Shuman et al. ............... 701/48 |
| 2003/0076981 A1 * | 4/2003 | Smith et al. ................. 382/104 |

\* cited by examiner

*Primary Examiner*—Thu V. Nguyen
(74) *Attorney, Agent, or Firm*—Frank A. MacKenzie; Artz & Artz, P.C.

(57) ABSTRACT

A crash assessment and safety device activation system includes a target object potentially colliding with a host object in motion, is disclosed. A remote sensor is coupled to the host object and adapted to detect a target object within a region sensed thereby and generate an object signal from the target object. A visual sensor is adapted to sense the region sensed by the remote sensor and therefrom generate a visual signal. A safety device actuator is coupled to the host object and adapted to activate a safety device. A controller is attached to the host object, the remote sensor, the visual sensor and the safety device actuator. The control is adapted to assess collision threat from the remote sensor signal and confirm the presence of the target object with the vision sensor. The controller is further adapted to control the safety device actuator in response said threat assessment.

17 Claims, 5 Drawing Sheets

SENSING STRATEGY FOR DAMAGE MITIGATION IN COMPATABILITY SITUATIONS

BACKGROUND OF INVENTION

1. Technical Field

The present invention relates generally to crash detection and damage mitigation systems for automotive vehicles, and more particularly to external airbag deployment in crash situations.

2. Background Art

Due to the current density of traffic on the roads, motor vehicle operators are flooded with information. Consequently, operating a motor vehicle is a complex procedure in which various situations occur in which the operator has limited, little, or no time to react or to manually engage safety measures.

Many previously known crash detection systems have incorporated crash detection algorithms based on sensed data. The application of remote sensing systems using radar, lidar, and vision-based technologies for object detection, tracking, alarm processing, and potential safety countermeasure activation is well known in the art.

Based on range and bearing information provided by radar, lidar or vision-based sensing systems and additional information obtained from the host vehicle sensors, various algorithms have been used to track the paths of host and target vehicles. Algorithms have also been incorporated to estimate the future position of obstacles or vehicles in the host vehicle path.

Some safety systems, such as front and side airbags, activate after physical contact occurs between two vehicles. A typical airbag deploys within approximately 70 ms. Both active and passive safety countermeasures can take advantage of pre-crash sensing. For example, a typical motorized retractable belt requires about 200 ms or more to reduce the slack in the belt system and pull the driver closer to the seat. Through accident prediction, additional time is generated for the deployment of active and passive countermeasures.

Currently, accident prediction algorithms are used primarily for collision warning and avoidance and therefore typically cover ranges up to a few hundred meters ahead of the host vehicle. However, in unavoidable collision situations, the range under consideration is substantially shorter. Therefore, damage minimization techniques must predict an unavoidable collision and deploy safety measures within a short time.

For pre-crash sensing, vehicle sensors need to not only detect possible threats but classify them as well. Classifications are often broken down into different target categories, such as: target vehicle type, wall, pole, and pedestrian.

For situations involving the target vehicle category, a classification scheme is patent pending for Ford Global Technologies to determine the direction and angle of the target vehicle and its type, e.g., frontal view of a car, side view of an SUV, and rear view of a large truck.

The limitations associated with current accident damage minimization techniques have made it apparent that a new technique to minimize collision damage is needed. The new technique should predict a target vehicle's position with respect to a host vehicle and should also provide a deployment decision tailored to the nature and time requirement of the countermeasure. The new technique should also reduce structural damage incurred by the host and target vehicles. The present invention is directed to these ends.

SUMMARY OF INVENTION

The present invention provides a remote, non-contact-sensing-based, crash threat assessment system. The present invention also provides a non-contact-sensing-based, crash threat assessment system for an automobile.

In accordance with the present invention, a crash assessment and safety device activation system, which includes a first target object potentially colliding with a host object in motion, is disclosed. A first remote sensor is coupled to the host object and adapted to detect a first target object within a region sensed thereby and generate a first signal. A visual sensor is also coupled to the host object and adapted to sense the region sensed by the first remote sensor and there from generate a visual signal. A first safety device actuator is coupled to the host object and adapted to activate a first safety device. A controller is adapted to receive the visual signal and is further adapted to generate a confirmation signal for the first target object through checking the first object signal with the visual signal. The controller is still further adapted to control the first safety device actuator in response to the confirmation signal.

A crash threat assessment and damage mitigation method for a host vehicle in motion including a first remote sensor coupled thereto, a second remote sensor coupled thereto, and a visual sensor coupled thereto. The first remote sensor senses a first target object and generates a first object signal from it. The first object signal is verified by polling the first object signal and a signal from the second remote sensor. The first target object is visually confirmed with the visual sensor. The controller then determines whether a potential for crash is within a safety device activation threshold. An external airbag is then deployed in response to a determination that the first target object is a vehicle and that the host vehicle will crash into the first target object such that damage or injury resultant from the crash will be reduced by deployment of the external airbag.

Advantages of the current invention are that remote sensing of target objects in a region in front of the host vehicle is used and threat assessment is made through a fast, robust and reliable algorithm. Additionally, the verification scheme involving a visual sensor or camera is used in conjunction with another remote sensor to improve accuracy and prevent safety device misfires.

Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a crash assessment and safety device activation system 1, particularly suited to the automotive field. The present invention is, however, applicable to various other uses that may require crash assessment, as will be understood by one skilled in the art.

Figure 1:
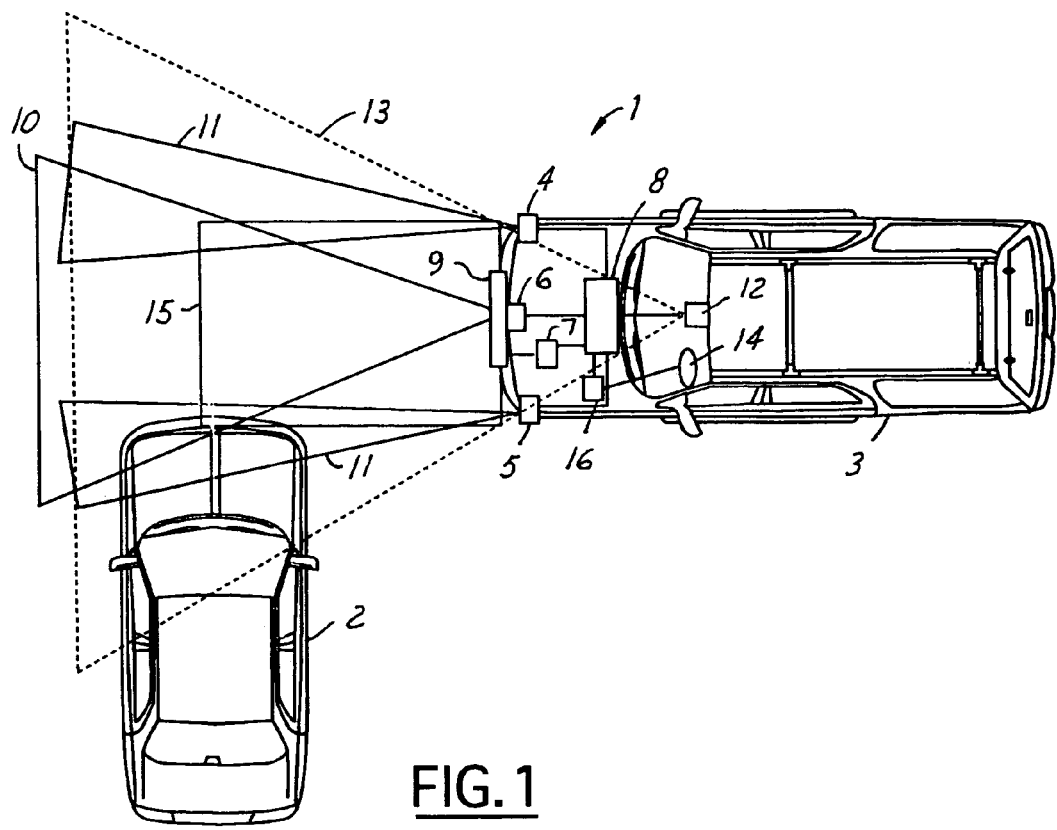
FIG. 1 is a crash assessment and safety device activation system in accordance with a preferred embodiment of the present invention.

Referring to FIG. 1, a crash assessment and safety device activation system 1, including a first target object (here illustrated as a first target vehicle 2 moving upwards) potentially colliding with a host object (here illustrated as a host vehicle 3 moving to the left), is illustrated.

One embodiment of the host vehicle 3 includes at least two remote sensors coupled to the host vehicle (12 and 6 or 12, 4 and 5). A controller 8 and at least one safety device actuator (7, 16) are also coupled to the host vehicle. Still further included is at least one safety device (9, 14) coupled to the vehicle 3.

The first target object is an object, either stationary or in motion, that has a high potential for crash with the host vehicle 3. High potential for crash will be discussed later.

The host vehicle 3 is an object in motion, mounted with at least two remote sensors (12 and 6 or 12, 4 and 5). The embodied host vehicle 3 is an SUV, however, alternate embodiments include cars trucks and other known modes of transportation.

The remote sensors (or sensing system) detect vehicle states (dynamics) of the first target vehicle 2. Ideally, the sensing system includes at least one radar sensor (4 and 5, or 6 alone) and at least one vision based sensor 12. However, numerous combinations including multiple radars (4, 5), lidar, or vision sensor only based remote sensing systems are included in alternate embodiments of the present invention. In one possible combination the area 11 sensed by the radar sensors 4, 5 is illustrated in front of the host vehicle 3 and is defined by two triangles illustrating typical radar sensor range. Both radars 4, 5 are ideally angled away from each other so that there is little or no overlap between them. An alternate embodiment includes the sensor 6 sensing a triangular area 10. The area 13 sensed by the vision sensor 12 is also defined by a triangular region illustrating a typical vision sensor range. The sensors generate target vehicle 2 or target object signals, as will be discussed later.

At least one safety device actuator is coupled to the host vehicle. The present invention includes an external airbag actuator 7 (first actuator), and a crash device actuator 16 (second actuator). The first safety device actuator 7 is coupled to the host vehicle 3. This actuator 7 activates the first safety device 9, here embodied as an external airbag. The second safety device actuator 16 is also coupled to the host vehicle 3. The second safety device actuator 16, here embodied as a crash device actuator, activates other internal safety devices 14, such as seat-belt retractors, airbags and the like. It is important to note that numerous actuators and safety devices may be added to the system as needed by the manufacturer, as will be understood by one skilled in the art.

Each individual safety device has a substantially unique time requirement to become fully effective, and the decision to activate a particular safety device takes this unique time requirement into consideration. For example, the activation decision time for motorized belt retraction is earlier than for pre-arming airbags due to relatively longer deployment time requirements for it. A method for determining when to deploy the external airbag will be discussed later with reference to FIG. 5.

The safety device controller 8 is also coupled to the host vehicle 3. The controller 8 receives the sensor signals and estimates therefrom the future position of the target vehicle 2, with respect to the host vehicle 3, to determine which safety devices should activate. The controller 8 also estimates whether a potential for crash between the host vehicle 3 and the first target vehicle 2 is within the threshold criteria for the safety device actuator 7, based on the activation time considerations of the first safety device 9.

The critical zone 15 for external airbag activation is illustrated with a rectangular region about 120 ms times the maximum allowable closing velocity of the target vehicle, or approximately three meters long, and as wide as the host vehicle in front of the host vehicle 3. The vision system is included to make a "vehicle—no vehicle" determination in a region within the coverage zone of the radars in a time frame needed for the external bag deployment. Thus the vision system must be able to scan a region in front of the host vehicle and give a determination the instant an object has entered the critical zone 15 in front of the vehicle as to whether it is a vehicle or not. To achieve this, the image processing should have made this type determination at least one update cycle prior to the object reaching this boundary.

The controller 8 also estimates whether a potential for a crash between the host vehicle 3 and the first target vehicle 2 is within alternate threshold criteria for the other safety device actuators, based on the activation time considerations of other host vehicle safety devices such as motorized seatbelt retractors and internal airbags, as will be understood by one skilled in the art. The operations of the controller 8 will be discussed in detail later.

Figure 2:
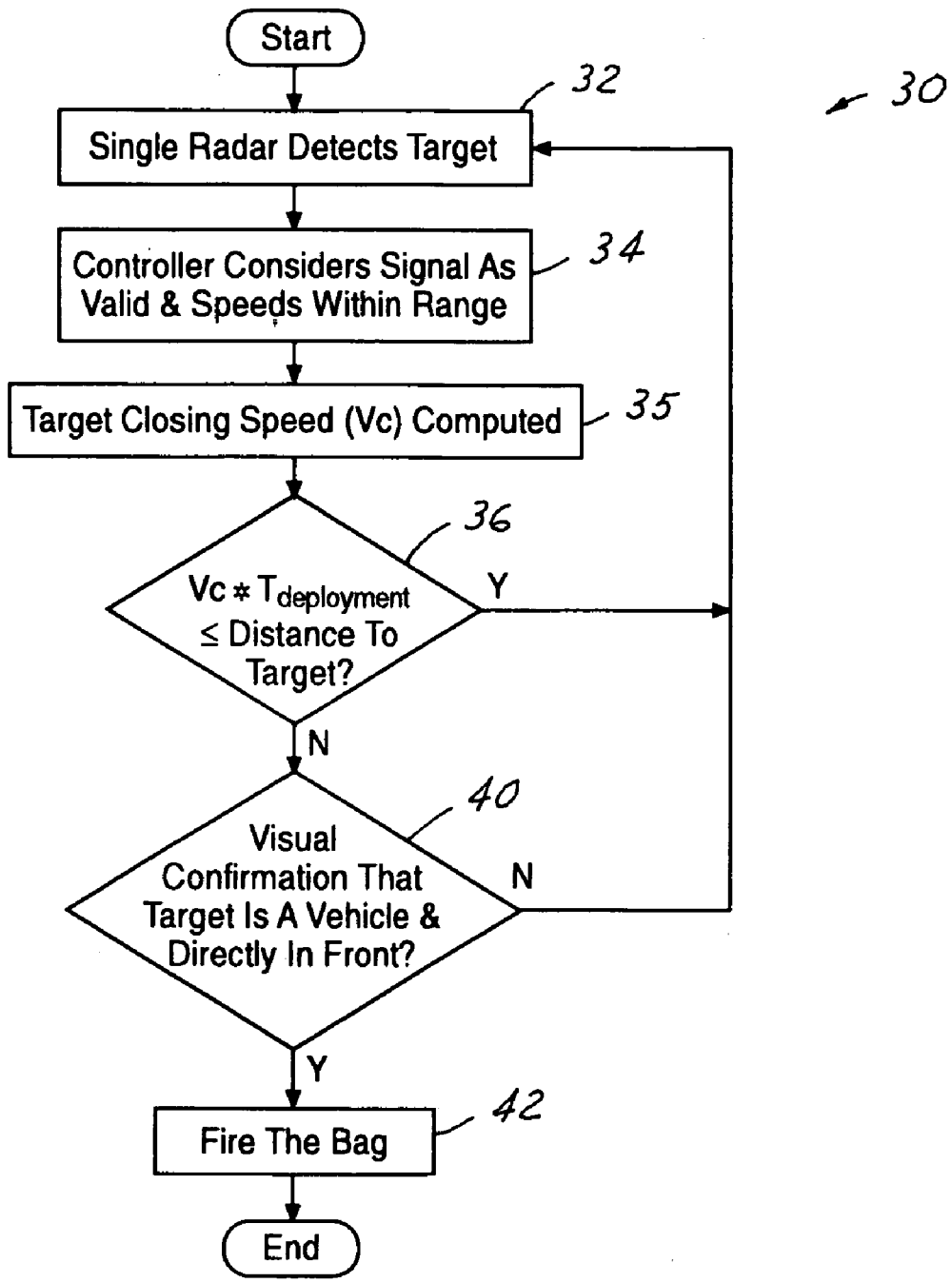
FIG. 2 is a block diagram of a crash assessment and safety device activation method, incorporating at least two remote sensors, in accordance with another embodiment of the present invention.

Referring to FIG. 2, a block diagram of a crash assessment and safety device activation method 30, incorporating at least two remote sensors, in accordance with another embodiment of the present invention, is illustrated.

Logic starts in operation block 32 where a single radar senses an object in the path of the host vehicle and generates therefrom an object signal. Important to note is that the radar is one embodiment and alternate embodiments include lidar, or vision sensor based remote sensing systems.

Figure 5:
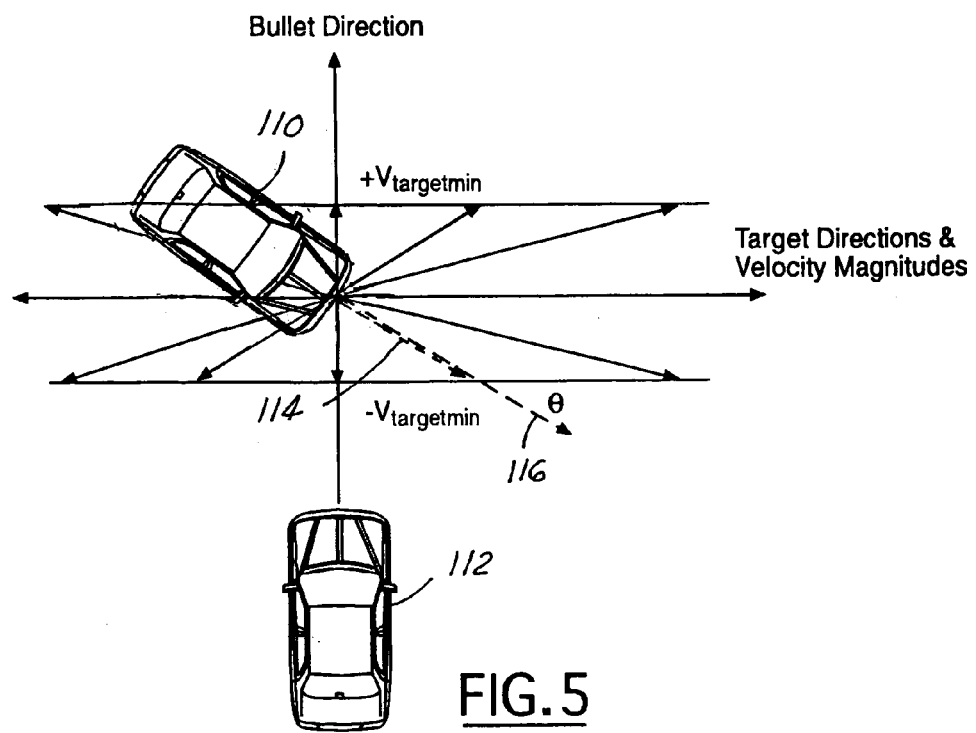
FIG. 5 is a diagram illustrating the direction and speed ranges permitted for the target vehicle.

In operation block 34, the object signal is received in the controller, which makes a determination as to the nature of the signal and whether speeds are within the system activation range, as will be discussed in regards to FIGS. 4 and 5.

In operation block 35, the target closing speed, Vc, is computed using the sensing system ability to either measure it directly (e.g., through a Doppler process) or by differencing distance measurements over time. In inquiry block 36, a check is made as to whether time is crucial for deployment of the external airbag. This is determined by comparing the current distance to the target against the closing speed times the countermeasure deployment time requirement. For a positive response, the airbag is not deployed (i.e. return to operation block 32), and the system continues monitoring the target.

Otherwise, in inquiry block 40, a check is made whether the radar still "sees" or senses the target and whether the vision sensor is sensing that the object is a vehicle and that it is positioned directly in front of the host (bullet) vehicle. For a negative response, the system continues monitoring the target, and the bag is not deployed. Otherwise in operation block 42, the bag is deployed, i.e. fired.

Figure 3:
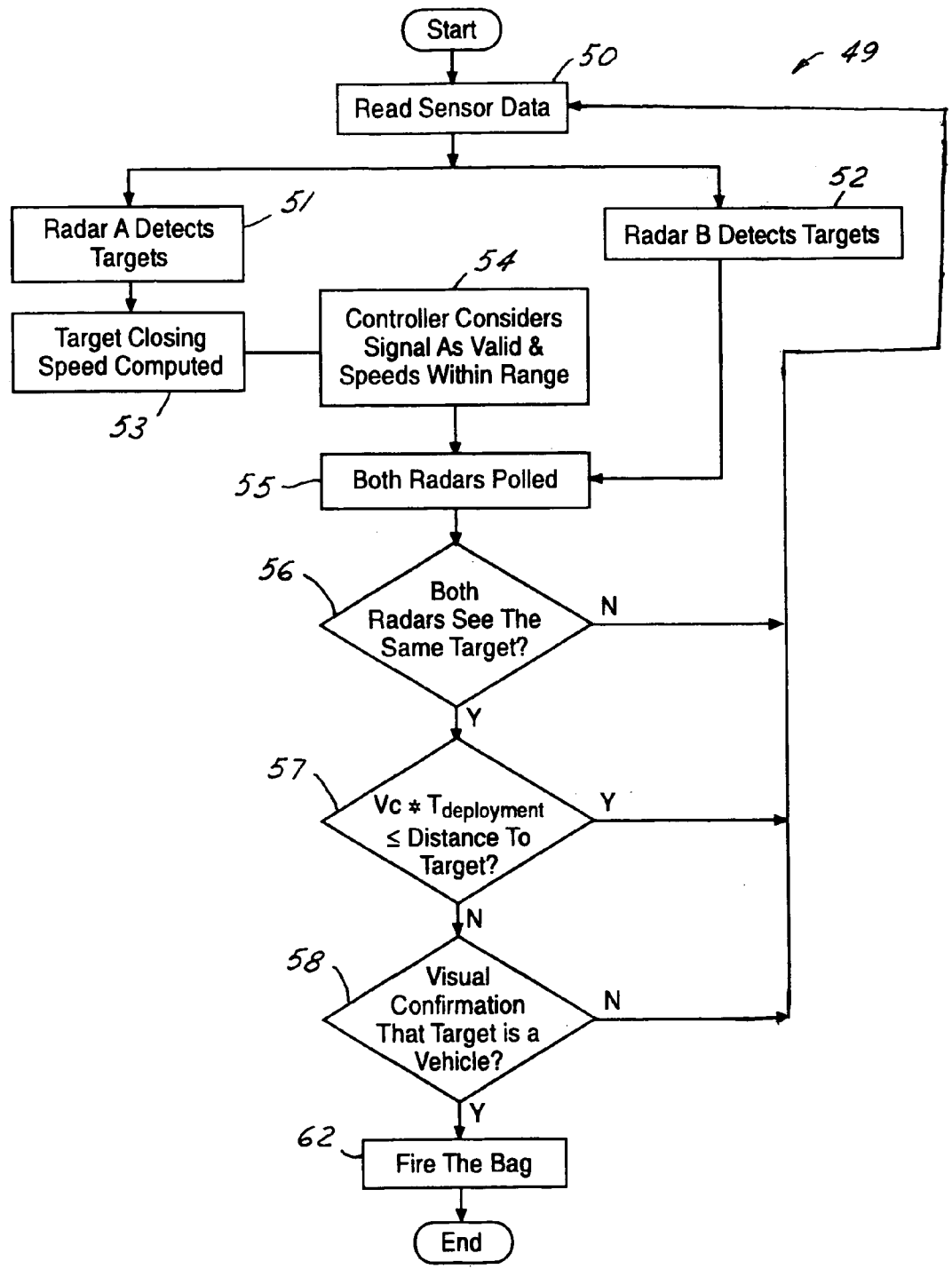
FIG. 3 is a block diagram of a crash assessment and safety device activation method, incorporating at least three remote sensors, in accordance with another embodiment of the present invention.

Referring to FIG. 3 a block diagram of a crash assessment and safety device activation method 49, incorporating at least three remote sensors, in accordance with another embodiment of the present invention, is illustrated.

Logic starts in operation blocks 50 when sensor data is read into the controller. In operation block 51, the first radar senses an object or "threat" in the path of the host vehicle and generates therefrom a first object signal. Important to note is that the radar is one embodiment and alternate embodiments include lidar, or vision sensor based remote sensing systems.

In operation block 52, a second radar may also sense the object or "threat" and generates therefrom a second object signal. This dual sensing of an object provides increased accuracy in threat determinations and reduces the likelihood of inaccurate target signals. In this embodiment, it is not necessary for the second radar to detect the target at the same time as the first. It is only necessary for both the radars to confirm the presence of the object in its field of view as the object enters the critical zone. To illustrate the above concept, in FIG. 3, radar A is shown as assessing the object signal or threat for example by tracking the object and by performing speed analysis and radar B is shown as just confirming the presence of the object. In reality, both the radars can assess the threat, or radar A or B can assess the threat and the other radar can confirm the presence of the object in its field of view.

In operation block 53 the target closing velocity Vc is calculated. In operation block 54, the controller makes a determination based on host and target vehicle speeds, as will be discussed in regards to FIG. 4.

In the operational block 55 both radar units are continually polled. In inquiry block 56, a determination is made as to whether both radars see the same target, i.e., have a signal at basically the same radial distance. This is critical as it helps define the lateral extent of the target. A large target that extends across the front of the host vehicle is more likely to be a legitimate target (i.e., a vehicle) that will be hit flushly. In operation block 56, both object signals are received in the controller. The controller analyzes the signals (i.e. polls the radars) to determine whether the target object is sensed by both radars.

In inquiry block 57, a check is made as to whether time is crucial for deployment of the external airbag. This is determined by comparing the current distance to the target against the closing speed times the countermeasure deployment time requirement. For a positive response, continue monitoring the target.

For a negative response to inquiry block 57, a check is made in inquiry block 58 as to whether the vision sensor is sensing that the object is a vehicle. For a negative response, the airbag is not deployed. Otherwise, operation block 62 activates and the external airbag is deployed.

As an illustrative example for a target object entering from the left, let's begin by assuming that the vision system detects the object. The target is judged a vehicle and legitimate threat if it is in the critical zone and it has sufficient vertical extent and the left edge of the object occurs before the left side of the host vehicle and the right edge of the object extends into the right half of the visual field. For an object entering from the right, the procedure is similar to above but reversed. For an object entering centrally, the target is judged a vehicle and legitimate threat if the image has sufficient vertical extent and either the left edge of the object extends past the left side of the host vehicle the right edge of the object extends into the right half of the visual field. Important to note is that sufficient vertical extent is determined as a function of the camera position, field of view, and characteristics for a vehicle at the appropriate distance, as will be discussed regarding FIG. 6.

Given that the bag is to be deployed when the host vehicle is the aggressor, the approach angle of the target vehicle can range from directly ahead to +/−45° from the corners of the host vehicle (the latter is the case for equal speeds on orthogonal trajectories).

The default state for the vision system is ideally "no vehicle present," and the airbag deploys only when hitting a vehicle.

Figure 4:
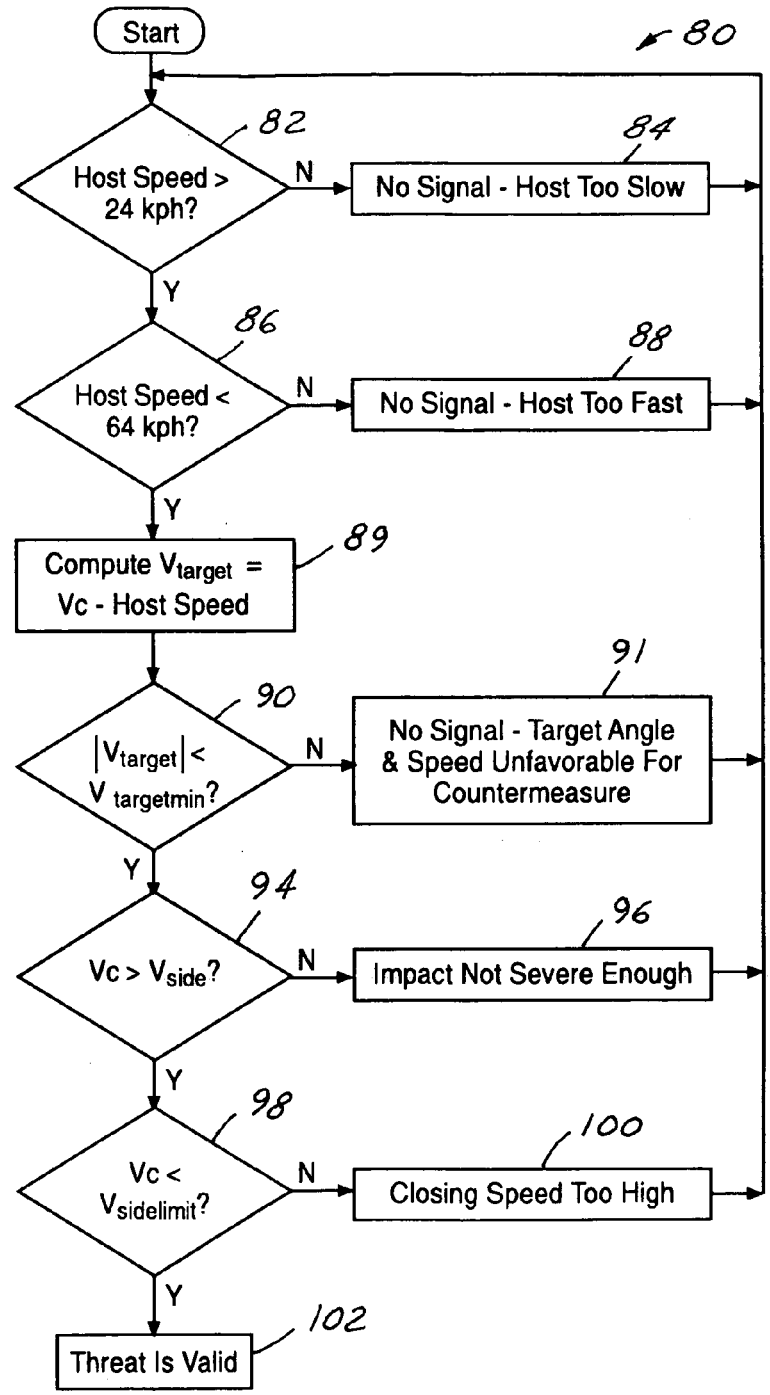
FIG. 4 is a block diagram of a method for host and target vehicle speed considerations in accordance with one embodiment of the present invention.

In FIG. 4 a block diagram of a method 80 for host and target vehicle speed considerations, in accordance with one embodiment of the present invention, is illustrated.

Logic starts in inquiry block 82 where a check is made as to whether the host speed is greater than 24 kph. For a negative response, the host is moving too slowly to receive much benefit from the external airbag, and therefore, in operation block 84, the bag is not fired.

Otherwise, in inquiry block 86, a check is made whether the host speed is less than 64 kph. For a negative response, operation block 88 activates, and a determination is made that the host object is moving too fast to benefit from deployment of the external airbag.

In operation block 89, $V_{target}$ is computed. $V_{target}$ is given by:

$$V_{target} = Vc - \text{host vehicle speed}.$$

Here Vc is the closing velocity between the two objects or vehicles (obtained from radar signals).

In inquiry block 90, a check is made whether the absolute value of the target velocity (in the direction of travel of the host vehicle) is less than the minimum velocity parameter, $V_{targetmin}$.

For a negative response, in operation block 91, no signal for airbag activation is given, as the target angle and speed are unfavorable for airbag activation, which will be discussed later.

The probability that the host vehicle will hit the target vehicle on the target vehicle side when a collision occurs is given by:

$$\frac{1}{1 + \frac{T_w + B_1}{B_w + T_1} * \frac{V_T}{V_B}}.$$

The subscripts w and l are for the width and lengths of the host vehicle B, and the target vehicle T. If the target vehicle is traveling at an angle θ, with respect to the horizontal, then the probability becomes:

$$\frac{\tilde{T}_1 \cos\theta}{(\tilde{T}_1 \cos\theta + \tilde{T}_w \sin|\theta|)}{1 + \frac{\hat{T}_w + B_1}{B_w + \hat{T}_1} * \frac{V_T}{V_B}}.$$

The ~ represents the actual dimensions and the ^ represents the new width and length of a box enclosing the target vehicle moving at the angle θ (measured as the angle of the target vehicle from horizontal).

In inquiry block 94, a check is made whether $V_C$ is greater than $V_{side}$. $V_{side}$ is the velocity threshold of incompatibility in side impact, i.e. when it would not be beneficial to fire the airbag. For a negative response, operation block 96 activates and a determination is made that the situation is not severe enough to fire the airbag.

Otherwise, in inquiry block 98, a check is made whether $V_C$ is less than $V_{sidelimit}$, where $V_{sidelimit}$ is the maximum speed over which the sensing can reliably perform. For a negative response, operation block 100 activates and a determination is made that the speed is too high. Therefore, the airbag is not fired.

Otherwise, in operation block 102, a determination is made that the threat is valid. A check is made whether $V_c$ multiplied by $T_r$ is less than $D_r$. $T_r$ is system time response and $D_r$ is the distance from the radar to the target. If it is, then it is too early to fire the airbag for effective protection, and the airbag is not fired. Otherwise, the airbag is fired.

Referring again to operation block 91, the decision not to activate the airbag system is made based on the speed and orientation of the target vehicle relative to the host vehicle. FIG. 5 illustrates this. The target vehicle 110 can travel in any direction, as indicated by a number of direction arrows (the bullet, host vehicle 112, is assumed to be traveling upwards in this illustration). The lengths of the arrows can correspond to the velocity of the target. By setting a value for the parameter $V_{targetmin}$ it can be seen that for any direction and speed of the target vehicle, only those whose arrows fit in between the two boundary lines (at $+/-V_{targetmin}$) will pass with a "system on" status and pass through inquiry block 90. For example, consider the target 110 moving in the direction shown in FIG. 5 but at two different speeds illustrated by the short dashed line 114 and the thicker, longer dashed lines 116. The former fits in the bands and so this condition will be considered for bag deployment. However, the speed of the latter is too large, and extends past the bands. For this case the target 110 is moving too fast and the airbag system is not deployed.

This process allows for the target vehicle 110 to be moving at any speed if it is orthogonal to the path of the host vehicle 112. However, as the target 110 rotates away from the orthogonal, a constraint is imposed on the speed allowed, and this constraint increases as the vehicle 110 turns more and more from an orthogonal path. One can also see that a target 110 moving directly towards as well as directly away from the host 112 is permitted, albeit at low relative speeds. All of this is controlled by a judicious choice of the parameter $V_{targetmin}$.

Advantages of having a small value for $V_{targetmin}$ are that this properly biases system activation towards only side-moving targets, reduces false positives resulting from close pass-by of vehicles moving in opposite directions (radar will reject without asking vision for confirmation), and places no restriction on target speed when traveling orthogonally to host vehicle.

One observation from accident data is that side impacts occur predominantly where the target is oriented between 0 and ±30° from an orthogonal direction to the direction of travel of the host vehicle, and one embodiment includes this as the cutoff angle for the external airbag. External bumper airbags provide significant benefits in improving vehicle-to-vehicle compatibility in side impacts in addition to providing enhanced protection to the occupants of the host vehicles.

Figure 6:
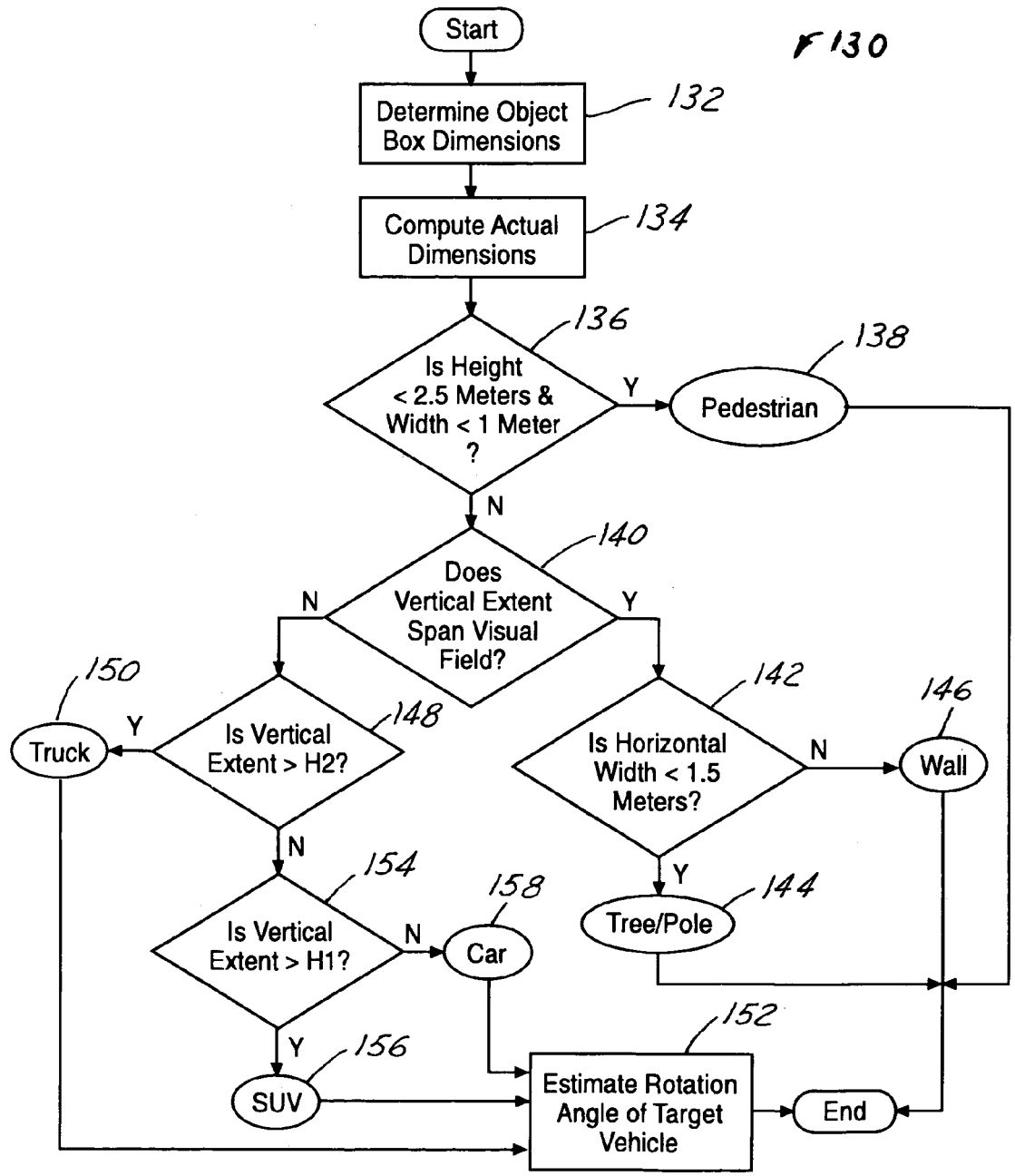
FIG. 6 is a block diagram of a classifying system for a target, in accordance with another embodiment of the present invention.

Referring to FIG. 6, a block diagram 130 of a classifying method for a host vehicle, in accordance with one embodiment of the present invention, is illustrated. Logic starts in operation block 132 where a target object is sensed from a vision sensor on the host vehicle. The sensor data is received in the controller, and the object box dimensions for the bounding box for the target object is generated. In operation block 134 these pixel dimensions for the bounding box are converted into metric physical dimensions using the characteristics of the vision system.

The analysis phase then begins with an inquiry in block 136 as to whether the target object has a height less than 2.5 meters and a width less than 1 meter. For a positive response, block 138 activates, and a pedestrian classification is made for the target object.

Otherwise, inquiry block 140 activates, and an inquiry is made as to whether the target object vertically spans the visual field of the sensor.

For a positive response to inquiry block 140, an inquiry is made in block 142 as to whether the target object horizontal width is less than 1.5 meters. For a negative response, the target object is classified as a wall in operation block 146. Otherwise, the target object is classified a tree or a pole in operation block 144.

For a negative response to inquiry block 140, an inquiry is made in inquiry block 148 as to whether the target object vertical extent is greater than a prescribed height H2. For a positive response, operation block 150 activates, and the target object is classified as a truck.

Otherwise, an inquiry is made in inquiry block 154 as to whether the vertical extent of the target object is greater than a prescribed height H1. For a positive response, operation block 156 activates, and the target object is classified as an SUV.

Otherwise, operation block 158 activates, and the target object is classified as a car. The rotation angle of the target vehicle is then estimated in operation block 152. Based on this visual classification, the external airbag may be activated only when the object is confirmed as a car or a SUV. The system can be further refined by estimating the angle of impact and, with this information, decide to deploy only if the side of the vehicle is being struck, for example.

In operation, the crash threat assessment and damage mitigation method for a host vehicle in motion includes a first remote sensor coupled thereto, a second remote sensor coupled thereto, and a visual sensor coupled thereto. The first remote sensor senses a first target object and generates a first object signal there from. A check is made of the first object signal by polling the first object signal and a signal from the second remote sensor of an area in front of the host vehicle. When the second sensor (for a host vehicle including a second remote sensor) verifies the existence of the target object, a visual sensor visually confirms the first target object. The visual sensor also ideally uses object recognition software to determine the nature of the target object, which is to be used in the countermeasure deployment considerations. When a potential for crash is within a safety device activation threshold, an external airbag is deployed.

From the foregoing, it can be seen that there has been brought to the art a new remote sensing based crash assessment and damage mitigation system. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

What is claimed is:

1. A crash assessment and safety device activation system, including a host object, comprising:
a first remote sensor coupled to the host object and adapted to detect a first target object within a region sensed by said first remote sensor and generate a first object signal from said first target object;

a first vision system adapted to sense an area relative to a critical zone of the host object, said area comprising at least a portion of said region sensed by said first remote sensor and further defined as a function of at least one update cycle prior to said first target object reaching said critical zone, and therefrom generate a visual signal comprising a vehicle determination or no vehicle determination generated while said first target object is in said area relative to said critical zone and before said target object reaches said critical zone;

a first safety device actuator, coupled to the host object and adapted to activate a first safety device; and a controller, coupled to the host object and adapted to receive said first object signal and said visual signal, said controller further adapted to generate a confirmation signal for said first target object through checking said first object signal with said visual signal, said controller further adapted to control said first safety device actuator in response to said confirmation signal.

2. The system of claim 1 wherein said remote sensor comprises one of a radar sensor, a lidar sensor or a vision-based sensor.

3. The system of claim 1 further comprising a second remote sensor coupled to the host vehicle and adapted to scan for said first target object within at least a portion of said region scanned by said first visual sensor and from a result of said scan, generate a second remote sensor signal.

4. The system of claim 3, wherein said first remote sensor and said second remote sensor are angled away from each other.

5. The system of claim 3, further comprising verifying that said first target object is a vehicle by polling said first remote sensor signal and said second remote sensor signal.

6. The system of claim 1, wherein said critical zone sensed by said first visual sensor approximately equals at least one of 120 ms times the maximum allowable closing velocity of the target vehicle, or approximately 3 m.

7. The system of claim 1, further comprising a second safety device actuator coupled to the host vehicle and adapted to activate a second safety device.

8. The system of claim 1, wherein said first safety device comprises one of an external airbag, a nose dip device, an internal airbag, or a seatbelt pre-tensioner.

9. A crash threat assessment and damage mitigation method for a host vehicle including a first remote sensor coupled thereto and a visual sensor coupled thereto, comprising:

sensing a first target object with the first remote sensor;

generating a first object signal from said first remote sensor;

visually confirming said first target object is a vehicle or is not a vehicle before said first target object reaches a critical zone with the visual sensor through scanning an area relative to said critical zone of the host vehicle, said area relative to said critical zone defined as a function of at least one update cycle prior to said first target object reaching said critical zone; and deploying a safety device in response to a determination that said first target object is a vehicle and that the host vehicle will crash into said first target object such that a damage resultant from said crash to either said host vehicle or said target object will be reduced by deployment of said safety device.

10. The method of claim 9, further comprising verifying said first object signal by polling said first object signal and a signal from a second remote sensor.

11. The method of claim 9, further comprising sensing said critical zone with said visual sensor approximately equal to one of 120 ms times a maximum allowable closing velocity of said target vehicle or 3 m.

12. The method of claim 9, further comprising determining whether a potential for collision of the host vehicle and said first target object is within a safety device activation threshold.

13. The method of claim 9, wherein said step of deploying comprise deploying one of an external airbag or a nose dip device.

14. A crash threat assessment and damage mitigation method for a host vehicle including a first remote sensor coupled thereto, a second remote sensor coupled thereto, and a visual sensor coupled thereto, comprising:

sensing a first target object with the first remote sensor;

generating a first object signal from the first remote sensor;

verifying said first object signal by polling said first object signal and a signal from the second remote sensor;

visually confirming said first target object with the visual sensor;

generating a visual signal indicating whether said first target object is or is not a vehicle at least one update cycle prior to said first target object reaching said critical zone;

determining whether a potential for crash is within a safety device activation threshold; and deploying an external airbag in response to a, determination that said first target object is a vehicle and that the host vehicle will crash into said first target object such that a damage resultant from said crash will be reduced by deployment of said external airbag.

15. The method of claim 14, further comprising sensing a region with the visual sensor approximately equal to at least one of 120 ms times a maximum allowable closing velocity of said target object, or 3 m.

16. The method of claim 14, further comprising sensing a second target object with the first remote sensor;

generating a second object signal from the first remote sensor;

verifying said second object signal by polling said first remote sensor signal and a signal from the second remote sensor;

visually confirming said second target object with the visual sensor; and determining whether a potential for crash is within a safety device activation threshold.

17. The method of claim 14 further comprising generating a bounding box around an image of said target object in response to said visual sensor signal, said bounding box including a number of vertical pixels corresponding to a maximum height of said target object and a number of horizontal pixels corresponding to a maximum width of said target object;

activating vehicle classifying logic in response to said height and said width of said target object;

classifying said target object based on at least one of said target object height and said target object width; and activating a safety countermeasure based on said object classification information.

* * * * *